United States Patent
Rufail et al.

(10) Patent No.: US 10,823,757 B2
(45) Date of Patent: Nov. 3, 2020

(54) APPARATUS AND METHODS FOR NON-DESTRUCTIVE INSPECTION USING MICROWAVE MICROSCOPY

(71) Applicant: BOMBARDIER INC., Dorval (CA)

(72) Inventors: Leandro Rufail, Montreal (CA); Jean-Jacques Laurin, Montréal (CA); Fidele Moupfouma, Beaconsfield (CA)

(73) Assignee: BOMBARDIER INC., Dorval (CA)

( * ) Notice: Subject to any disclaimer, the term of this patent is extended or adjusted under 35 U.S.C. 154(b) by 203 days.

(21) Appl. No.: 16/020,261

(22) Filed: Jun. 27, 2018

(65) Prior Publication Data
US 2019/0004085 A1  Jan. 3, 2019

Related U.S. Application Data

(60) Provisional application No. 62/527,336, filed on Jun. 30, 2017.

(51) Int. Cl.
*G01Q 60/22* (2010.01)
*G01Q 70/06* (2010.01)

(52) U.S. Cl.
CPC ............ *G01Q 60/22* (2013.01); *G01Q 70/06* (2013.01)

(58) Field of Classification Search
CPC .............................. G01Q 60/22; G01Q 70/06
See application file for complete search history.

(56) References Cited

U.S. PATENT DOCUMENTS

| | | | |
|---|---|---|---|
| 6,359,446 B1 * | 3/2002 | Little, Jr. | G01N 22/00 324/637 |
| 7,307,431 B2 | 12/2007 | Safai et al. | |
| 9,429,422 B2 | 8/2016 | Bray et al. | |
| 2002/0067170 A1 * | 6/2002 | Ookubo | B82Y 35/00 324/635 |
| 2009/0066344 A1 | 3/2009 | Bray et al. | |
| 2015/0371907 A1 * | 12/2015 | Lu | H01L 21/3212 257/48 |
| 2016/0202689 A1 | 7/2016 | Szarski et al. | |

OTHER PUBLICATIONS

Gagne et al., Lightning Strike Protection of Composites, Progress in Aerospace Sciences, 2014, pp. 1-16, vol. 64, www.elsevier.com/locate/paerosci, Canada.

(Continued)

*Primary Examiner* — Que Tan Le
*Assistant Examiner* — Jennifer D Bennett
(74) *Attorney, Agent, or Firm* — Norton Rose Fulbright Canada LLP

(57) ABSTRACT

Methods and apparatus for non-destructive inspection using microwave microscopy are disclosed. In one embodiment, a method for inspecting an electrically-conductive mesh in a composite component using microwave microscopy comprises generating radio-frequency electromagnetic radiation using a microwave microscopy probe disposed adjacent the composite component so that the radio-frequency electromagnetic radiation interacts with the electrically-conductive mesh in the composite component, and, detecting a characteristic associated with the microwave microscopy probe. The detected characteristic is indicative of a condition of the electrically-conductive mesh.

42 Claims, 15 Drawing Sheets

(56) References Cited

OTHER PUBLICATIONS

Zhang et al., Galvanic Corrosion of Al/Cu meshes with Carbon Fibers and Graphene and ITO-based Nanocomposite Coatings as Alternative Approaches for Lightning Strikes, INT. J Adv Manuf Technol, 2013, pp. 1317-1323, vol. 67, Springer, USA.

Mulazimoglu et al., Recent Developments in Techniques to Minimize Lightning Current Arcing Between Fasteners and Composite Structure, Alcoa New Product Development, USA, www.alcoa.com/fastening_systems, accessed May 2017.

Reznik et al., Electrodynamics of Microwave Near-Field Probing: Application to Medical Diagnostics, Journal of Applied Physics, 2005, pp. 114701-1-114701-9, vol. 98, American Institute of Physics, USA.

Talanov et al., Noncontact Electrical Metrology of Cu/low-k interconnect for Semiconductor Production Wafers, Applied Physics Letters, 2006, pp. 262901-1-262901-3, vol. 88, American Institute of Physics, USA.

Steinhauer et al., Surface Resistance Imaging with a Scanning Near-Field Microwave Microscope, Applied Physics Letters, Sep. 22, 1997, pp. 1736-1738, vol. 71 (12), American Institute of Physics, USA.

Steinhauer et al., Quantitative Imaging of Sheet Resistance with a Scanning Near-Field Microwave Microscope, Applied Physics Letters, 1998, pp. 861-863, vol. 72, American Institute of Physics, USA.

Anlage et al., Principles of Near-Field Microwave Microscopy, Scanning Probe Microscopy: Electrical and Electromechanical Phenomena at the Nanoscale, 2007, pp. 215-253, vol. 1, Springer-Verlag, USA.

Tabib-Azar et al., 0.4 µm spatial resolution with 1 GHz evanescent microwave probe, Review of Scientific Instruments, Mar. 1999, pp. 1725-1729, vol. 70, No. 3, American Institute of Physics, USA.

Jackson et al., Theory, Design, and Measurement of Novel Uniform Circular Antenna Arrays for Direction of Arrival Estimation, Scientific Report DRDC-RDDC-2015-R010, Jan. 2015, Defense Research and Development Canada, Canada.

\* cited by examiner

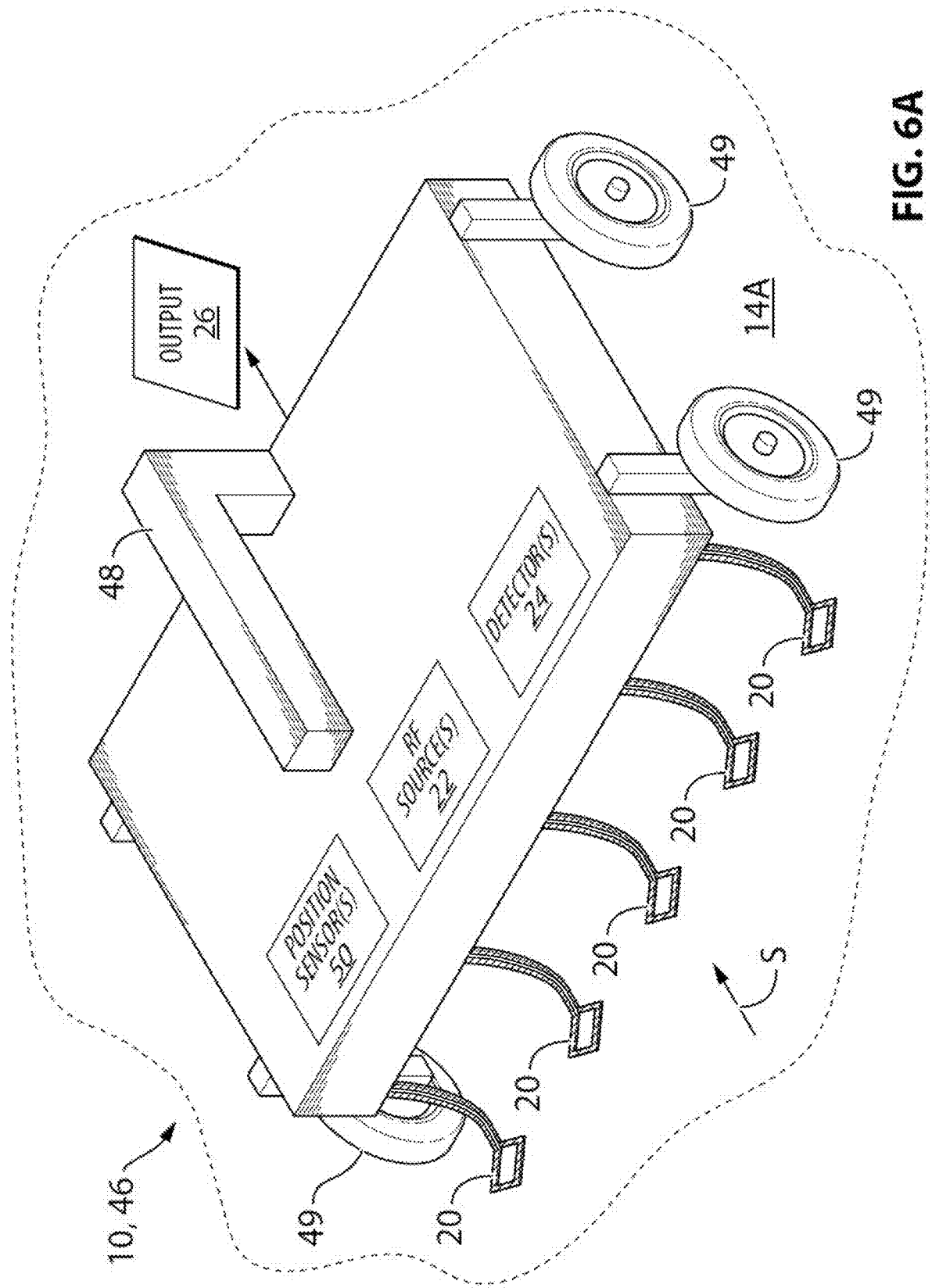

APPARATUS AND METHODS FOR NON-DESTRUCTIVE INSPECTION USING MICROWAVE MICROSCOPY

CROSS-REFERENCE TO RELATED APPLICATION(S)

This application relies for priority on U.S. Provisional Patent Application Ser. No. 62/527,336 filed on Jun. 30, 2017, the entire content of which is incorporated herein by reference.

TECHNICAL FIELD

The disclosure relates generally to non-destructive inspection, and more particularly to non-destructive inspection of an electrically-conductive mesh in a component using microwave microscopy.

BACKGROUND OF THE ART

Aircraft are susceptible to lightning strikes. The increased use of composite materials for aircraft structures can present challenges with providing suitable lightning strike protection for aircraft. Compared to their metal counterparts, some composite materials such as carbon fiber reinforced polymer (CFRP) do not conduct electric currents developed during a lightning event as efficiently. A lightning strike protection (LSP) mesh made of copper or aluminum can be incorporated in the composite structure to decrease the electrical resistance of the structure and provide an electrically-conductive path for currents generated during such lightning events.

It is important that the integrity of the LSP mesh is not compromised so that adequate lightning strike protection of the aircraft may be provided by the LSP mesh. Damage such as corrosion, cut strands or other defects in wires of the LSP mesh can be a source of arcing during a lightning strike event that could potentially lead to delaminations of composite structures, damage of communication equipment and/or ignition of fuel vapors.

SUMMARY

In one aspect, the disclosure describes a method for inspecting an electrically-conductive mesh in a composite component using microwave microscopy. The method comprises:

generating radio-frequency electromagnetic radiation using a microwave microscopy probe disposed adjacent the composite component so that the radio-frequency electromagnetic radiation interacts with the electrically-conductive mesh in the composite component; and detecting a characteristic associated with the microwave microscopy probe when the radio-frequency electromagnetic radiation is interacting with the electrically-conductive mesh, the characteristic being indicative of a condition of the electrically-conductive mesh.

In some embodiments, the method comprises:

sequentially causing the radio-frequency electromagnetic radiation to interact with different portions of the electrically-conductive mesh in the composite component, the different portions being associated with different relative positions of the microwave microscopy probe and the composite component, the different portions spanning over a plurality of regularly-spaced features of the electrically-conductive mesh;

detecting the characteristic associated with the microwave microscopy probe at each of the different relative positions of the composite component and the microwave microscopy probe, the detected characteristics defining a pattern related to the regularly-spaced features of the electrically-conductive mesh; and detecting an irregularity in the pattern defined by the detected characteristics, the irregularity being indicative of damage to the portion of the electrically-conductive mesh corresponding to the irregularity.

In some embodiments where the regularly-spaced features comprise openings where each opening is outlined by an electrical conductor defining an electrically-conductive loop, the method comprises generating a magnetic field using the microwave microscopy probe, the magnetic field simultaneously interacting with a majority of one of the conductive loops.

In some embodiments where the regularly-spaced features comprise electrical conductors defining electrically-conductive loops, the method comprises generating a magnetic field using the microwave microscopy probe, the magnetic field simultaneously interacting with a majority of one of the conductive loops.

In some embodiments, the magnetic field simultaneously interacts with substantially the entire one of the conductive loops.

In some embodiments, the damage to the corresponding portion of the electrically-conductive mesh comprises an electrical discontinuity.

In some embodiments, the pattern defined by the detected characteristics exhibits a shift indicative of a change in depth of the electrically-conductive mesh from a surface of the composite component.

In some embodiments, the pattern defined by the detected characteristics exhibits a shift indicative of a change in thickness of a paint overlaying the electrically-conductive mesh.

In some embodiments, the method comprises causing relative movement between the microwave microscopy probe and the composite component in a direction that is oblique to a row or column in which the regularly-spaced features lie.

In some embodiments, the method comprises causing relative movement between the microwave microscopy probe and the composite component while the microwave microscopy probe is in contact with the composite component.

In some embodiments, the method comprises causing relative movement between the microwave microscopy probe and the composite component while the microwave microscopy probe is resiliently biased against the composite component.

In some embodiments, the method comprises generating a magnetic field using the microwave microscopy probe, the magnetic field interacting with the electrically-conductive mesh in the composite component.

In some embodiments, the electrically-conductive mesh comprises an electrical conductor defining an electrically-conductive loop, the magnetic field simultaneously interacting with a majority of the electrically-conductive loop.

In some embodiments, the electrically-conductive mesh comprises an electrical conductor defining an electrically-conductive loop, the magnetic field simultaneously interacting with substantially the entire conductive loop.

In some embodiments, the condition of the electrically-conductive mesh comprises an electrical discontinuity in the electrically-conductive loop.

In some embodiments, the method comprises magnetically coupling the microwave microscopy probe to the electrically-conductive mesh.

In some embodiments, the characteristic associated with the microwave microscopy probe comprises a resonant frequency.

Embodiments can include combinations of the above features.

In another aspect, the disclosure describes a method for inspecting a component using microwave microscopy. The method comprises:

causing relative sliding between a microwave microscopy probe and the component between different positions of the microwave microscopy probe relative to the component; and
at each of the positions:
generating radio-frequency electromagnetic radiation for interacting with the component using the microwave microscopy probe; and
detecting a characteristic associated with the microwave microscopy probe when the radio-frequency electromagnetic radiation is interacting with the component, the characteristic being indicative of a condition of the component associated with the corresponding position.

In some embodiments, the method comprises resiliently biasing the microwave microscopy probe against the component while causing the relative sliding.

In some embodiments, the characteristic associated with the microwave microscopy probe comprises a resonant frequency.

In some embodiments, the method comprises generating a magnetic field for interacting with an electrically-conductive mesh in the component using the microwave microscopy probe.

Embodiments can include combinations of the above features.

In a further aspect, the disclosure describes an apparatus for inspecting an electrically-conductive mesh in a composite component where the electrically-conductive mesh comprises an electrical conductor defining an electrically-conductive loop. The apparatus comprises:

a radio-frequency source; and
a microwave microscopy probe operatively connected to the radio-frequency source and configured to generate radio-frequency electromagnetic radiation for interaction with the electrically-conductive mesh in the composite component, the microwave microscopy probe comprising a tip shaped to magnetically couple with a majority of the electrically-conductive loop defined by the electrical conductor of the electrically-conductive mesh.

In some embodiments, the tip is shaped to magnetically couple with substantially the entire electrically-conductive loop defined by the electrical conductor.

In some embodiments, the tip defines a two-dimensional shape that substantially matches a majority of a two-dimensional shape of the electrically-conductive loop defined by the electrical conductor.

In some embodiments, the tip defines a two-dimensional shape that substantially matches an entirety of a two-dimensional shape of the electrically-conductive loop defined by the electrical conductor.

In some embodiments, the two-dimensional shape of the tip substantially defines a quadrilateral.

In some embodiments, the two-dimensional shape of the tip substantially defines a rhomboid.

In some embodiments, the microwave microscopy probe is configured to be resiliently biased against the component.

In some embodiments, the microwave microscopy probe comprises a probe conductor printed on a film.

In some embodiments, the apparatus comprises a sensor configured to track a position of the microwave microscopy probe.

In some embodiments, the apparatus comprises a detector configured to generate an output indicative of a resonant frequency associated with the microwave microscopy probe.

In some embodiments, the apparatus comprises a plurality of microwave microscopy probes configured to generate radio-frequency electromagnetic radiation for interaction with different electrically-conductive loops defined in the electrically-conductive mesh of the composite component.

Embodiments can include combinations of the above features.

In a further aspect, the disclosure describes a system comprising:

a composite component comprising an electrically-conductive mesh including an electrical conductor defining an electrically-conductive loop; and
a microwave microscopy probe configured to generate radio-frequency electromagnetic radiation for interaction with the electrically-conductive mesh of the composite component, the microwave microscopy probe comprising a tip shaped to magnetically couple with a majority of the electrically-conductive loop defined by the electrical conductor.

In some embodiments, the tip is shaped to magnetically couple with substantially the entire electrically-conductive loop defined by the electrical conductor.

In some embodiments, the tip defines a two-dimensional shape that substantially matches a majority of a two-dimensional shape of the electrically-conductive loop defined by the electrical conductor.

In some embodiments, the tip defines a two-dimensional shape that substantially matches an entirety of a two-dimensional shape of the electrically-conductive loop defined by the electrical conductor.

In some embodiments, the two-dimensional shape of the tip substantially defines a quadrilateral.

In some embodiments, the two-dimensional shape of the tip substantially defines a rhomboid.

In some embodiments, the microwave microscopy probe is configured to be resiliently biased against the component.

In some embodiments, the microwave microscopy probe comprises a probe conductor printed on a film.

In some embodiments, the system comprises a plurality of microwave microscopy probes configured to generate radio-frequency electromagnetic radiation for interaction with different electrically-conductive loops defined in the electrically-conductive mesh of the composite component.

In some embodiments, the electrically-conductive loop outlines an opening in the electrically-conductive mesh.

In some embodiments, the electrically-conductive loop surrounds a plurality of openings in the electrically-conductive mesh.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 6A is a schematic perspective view of another exemplary embodiment of the apparatus for inspecting the electrically-conductive mesh in the component;

DETAILED DESCRIPTION

This disclosure relates to apparatus and methods for non-destructively inspecting components using microwave microscopy. In some embodiments, the apparatus and methods disclosed herein can be used to inspect an electrically-conductive (e.g., lightning protection) mesh incorporated in a composite aircraft component. In some embodiments, the apparatus and methods disclosed herein can be used to detect defects in the electrically-conductive mesh. Such defects can include manufacturing or installation defects, service/operation defects or other defects caused by a lightning strike event for example. In some embodiments, the apparatus and methods disclosed herein can be used to detect an electrical discontinuity in such electrically-conductive mesh. In some embodiments, the apparatus and methods disclosed herein can be used to measure a paint thickness overlaying such electrically-conductive mesh. Aspects of various embodiments are described through reference to the drawings.

Figure 1:
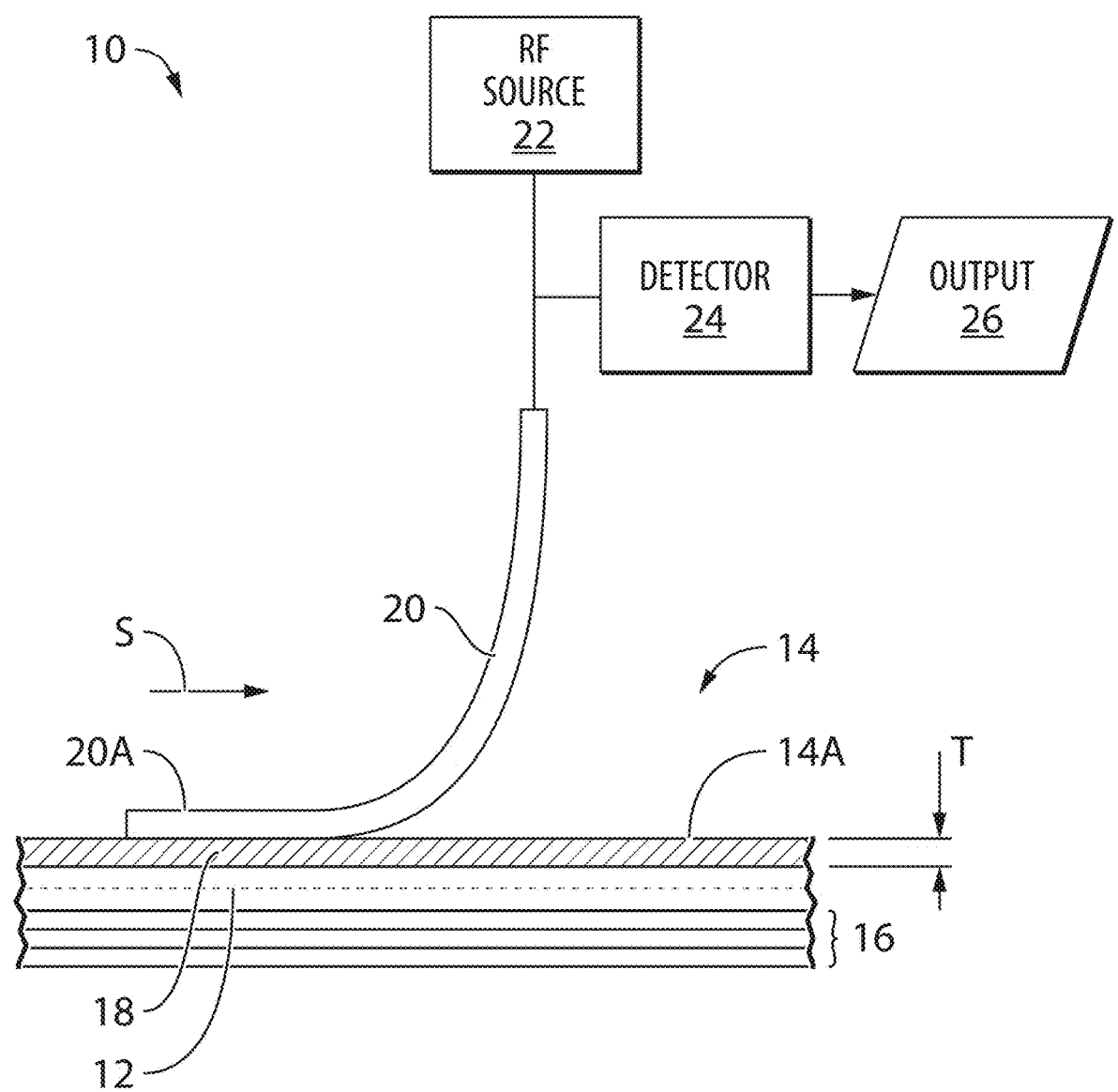
FIG. 1 is a schematic representation of an exemplary embodiment of an apparatus for inspecting an electrically-conductive mesh in a composite component.

FIG. 1 is a schematic representation of an exemplary embodiment of apparatus 10 for non-destructively inspecting electrically-conductive mesh 12 incorporated in composite component 14. It is understood that apparatus 10 could also be used to inspect other types of components. In some embodiments, mesh 12 can be a lightning protection mesh embedded in component 14. Component 14 can be a fiber-reinforced polymer with mesh 12 embedded therein. For example, component 14 can comprise a carbon-fiber-reinforced polymer (CFRP) including a matrix material (e.g., polymer resin such as epoxy) and a reinforcement (e.g., carbon fibers) embedded in the matrix material to provide strength. In some embodiments, mesh 12 can be disposed above fabric plies 16 of the CFRP material so as to be at or near outer surface 14A of component 14 and thereby provide an electrical path at or near outer surface 14A of component 14. Such positioning of mesh 12 can permit electrical current generated during a lightning strike event to be conducted by mesh 12 without having to penetrate through a significant thickness of component 14. In some embodiments, component 14 can comprise one or more paint layers 18 overlaying mesh 12 and having an overall thickness T. In some embodiments, apparatus 10 can also be used to measure the thickness of paint layer(s) 18 overlaying mesh 12 or to measure a depth of mesh 12 below outer surface 14A. Component 14 can, for example, be a (e.g., fuselage, wing, nacelle, empennage) skin of an aircraft where mesh 12 provides suitable lightning strike protection for component 14.

Apparatus 10 can be configured to conduct (e.g., near-field) scanning microwave microscopy and can also be referred to as a microwave microscope. In various embodiments, apparatus 10 can comprise microwave microscopy probe 20, radio-frequency source 22 (referred hereinafter as "RF source 22") and detector 24. Probe 20 can be operatively connected to RF source 22. RF source 22 can be configured to generate suitable signals (e.g., alternating current in the radio-frequency range) for driving probe 20. Probe 20 can be configured to generate radio-frequency electromagnetic radiation when driven by RF source 22. In some embodiments, probe 20 and RF source 22 can be configured to generate radio-frequency electromagnetic radiation having a frequency within the range of about 30 MHz to about 300 GHz. For example, in some embodiments, probe 20 and RF source 22 can be configured to generate radio-frequency electromagnetic radiation having a frequency within the microwave-frequency range. In some embodiments, RF source 22 can be a microwave source. The electromagnetic radiation generated at probe 20 can be directed toward component 14 so that the electromagnetic radiation can penetrate component 14 and interact with mesh 12.

Probe 20 can function as an antenna that interacts with component 14 and that is monitored by detector 24. Detector 24 can comprise any circuitry suitable for detecting a characteristic associated with probe 20 that is indicative of a condition of mesh 12. In some embodiments, such characteristic can be a measured parameter of the electromagnetic radiation being reflected from mesh 12 or from another part of component 14 when radio-frequency electromagnetic radiation generated with apparatus 10 is interacting with component 14. In some embodiments, such characteristic can be a measured parameter of an electric circuit including probe 20 when radio-frequency electromagnetic radiation generated with apparatus 10 is interacting with component 14. As explained below for example, detector 24 can be configured to generate output 26 that is indicative of an impedance variation, a change in a reflection coefficient (e.g., scattering parameter S11), a resonant frequency or a change in resonant frequency of a circuit including probe 20 when radio-frequency electromagnetic radiation generated with apparatus 10 is interacting with component 14.

In some embodiments, apparatus 10 and methods disclosed herein can be in accordance with the teachings presented in the following publication, which is incorporated herein by reference: L. Rufail, J. J. Laurin and F. Moupfouma, "Composite aircraft lightning strike protection damage evaluation using microwave microscopy techniques," 2017 11th European Conference on Antennas and Propagation (EUCAP), Paris, France, 19-24 Mar. 2017, pp. 689-692.

Probe 20 can comprise probe tip 20A disposed at a distal end of probe 20. Probe tip 20A can be configured to be placed in physical contact with, or maintained at a fixed distance from outer surface 14A of component 14 during operation. As explained below, probe 20 can be constructed so that probe 20 can be resiliently biased against outer surface 14A of component 14 and slid (i.e., swept) across surface 14A (e.g., see scanning direction S) of component 14 in order to scan and inspect a region of component 14. In some embodiments, probe 20 can comprise a probe conductor printed on a flexible film such as KAPTON® polyimide film for example. In other words, probe tip 20A can be in frictional engagement with outer surface 14A of component 14 and hence rub against outer surface 14A during relative movement between probe tip 20A and component 14.

Figure 2:
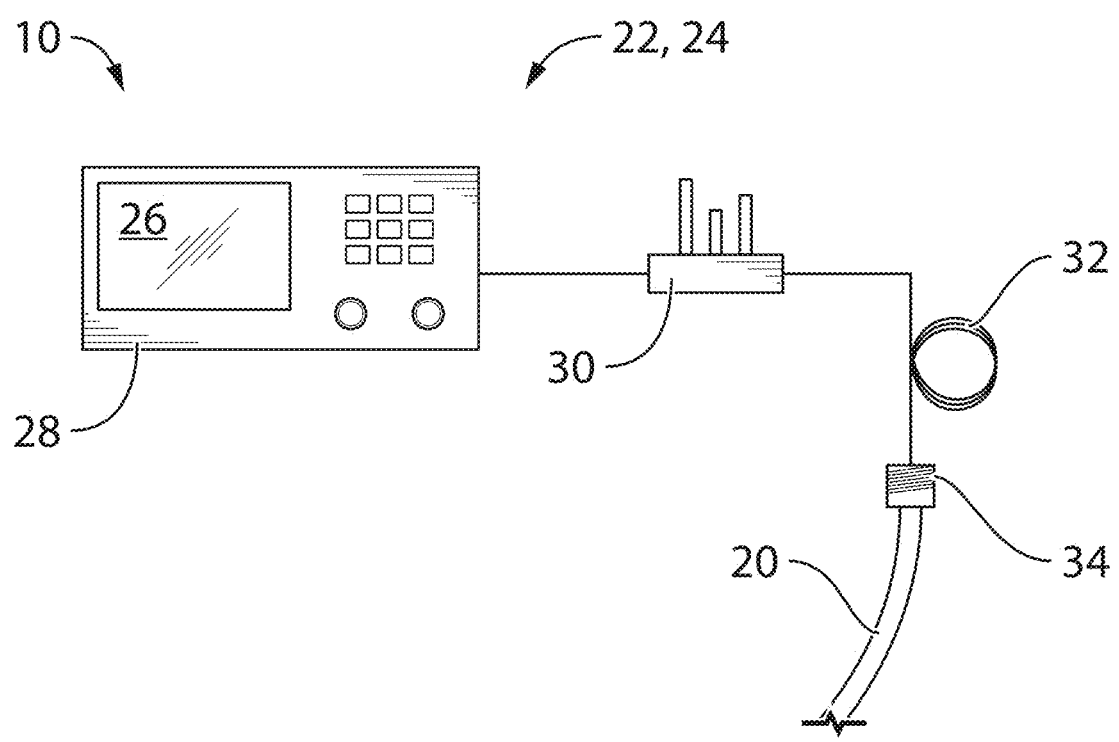
FIG. 2 is a schematic representation of another exemplary embodiment of the apparatus for inspecting the electrically-conductive mesh in the component.

FIG. 2 is a schematic representation of another exemplary embodiment of apparatus 10 where only an upper portion of probe 20 is illustrated. It is understood that RF source 22 and detector 24 can be implemented in any way suitable for conducting microwave microscopy. In some embodiments, apparatus 10 can, for example, comprise network analyzer 28 operatively connected to probe 20 via tuner 30, resonator 32 and coaxial connector 34. Together, tuner 30, resonator 32 and probe 20 can be configured to form a Fabry Perot resonator circuit/assembly that is highly sensitive to perturbations of probe 20. For example, variations in the properties of component 14 under study as probe 20 is (e.g., magnetically) coupled to component 14 and moved to different positions relative to component 14, can cause detectable perturbations (e.g., changes in input impedance, changes in reflection coefficient, changes in resonant frequency and changes in quality factor) associated with probe 20. In some embodiments, a suitable coupling component such as a capacitor, inductor or low-loss component can be used instead of tuner 30. Resonator 32 can comprise a coiled segment of low-loss coaxial cable in some embodiments. The segment of coaxial cable forming resonator 32 can be coupled to probe 20 via coaxial connector 34.

In some embodiments, network analyzer 28 can be configured to function as RF source 22 and also as detector 24. For example, network analyzer 28 can be configured to generate radio-frequency signals suitable for driving probe 20. In some embodiments, network analyzer 28 can be replaced with a signal generator having a frequency-following circuit and a lock-in amplifier in a feedback loop to lock onto the resonant frequency of the Fabry Perot resonator circuit/assembly formed by tuner 30, resonator 32 and probe 20. Network analyzer 28 can be configured to monitor a variation in a characteristic (e.g., impedance, reflection coefficient, resonant frequency and/or quality factor) associated with the resonator circuit/assembly comprising probe 20 at different positions of probe 20 relative to component 14. Variations in such characteristic can be indicative of one or more properties of component 14 at different positions. Such variations can be used to map such properties with respect to positions on component 14. In some embodiments, the characteristic can be indicative of a condition of mesh 12 at the corresponding position on component 14. Output 26 of network analyzer 28 can be provided on a display screen of network analyzer 28 or transferred to a data acquisition unit (e.g., computer, microcontroller, etc.). Output 26 can be provided in any suitable form of indication (e.g., visual or aural) to a user of apparatus 10.

Figure 3A:
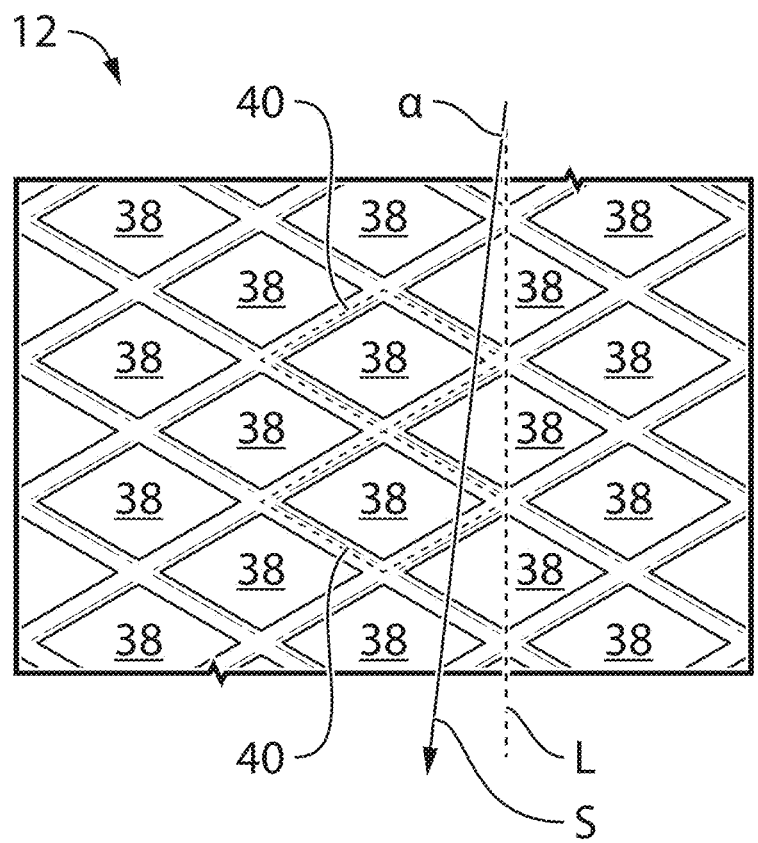
FIG. 3A is a top plan view of part of an exemplary electrically-conductive mesh for integration in the composite component of FIG. 1, showing electrically-conductive loops that outline respective openings in the electrically-conductive mesh.

FIG. 3A is a top plan view of part of an exemplary electrically-conductive mesh 12 suitable for integration with composite component 14. In some embodiments, mesh 12 can be of a type suitable for providing lightning protection in a composite aircraft structure. Mesh 12 can be made from a copper-based material, an aluminum-based material or other suitable (e.g., metallic) material(s) providing some electrical conductivity. In some embodiments, mesh 12 can be a wire mesh comprising a plurality of regularly-spaced features. For example, mesh 12 can comprise an array of openings 38. For example, mesh 12 can comprise a plurality of rows and columns of openings 38. For example, mesh 12 can comprise one or more rows or columns of aligned and regularly-spaced openings 38 (e.g., see line L).

Each opening 38 can be outlined by an electrical conductor defining an electrically-conductive loop 40 extending around opening 38. Each conductive loop 40 surrounding a respective opening 38 can be electrically coupled to adjacent conductive loops 40 at suitable junctions so that an electrically-conductive path can be provided between loops 40 and hence across mesh 12. For example, mesh 12 can comprise electrically-conductive wires or strands that are sintered or welded together and are shaped to define openings 38. It is understood that mesh 12 can have a different configuration than that shown in FIG. 3A and can have openings 38 of a different shape (e.g., square, circular, oval). In some embodiments, mesh 12 can have openings 38 that each define a quadrilateral shape. In some embodiments, mesh 12 can have openings 38 that each define a rhomboid (e.g., be diamond-shaped). In some embodiments, mesh 12 can have openings 38 of a uniform two-dimensional shape or can have openings 38 of two or more different two-dimensional shapes.

Figure 3B:
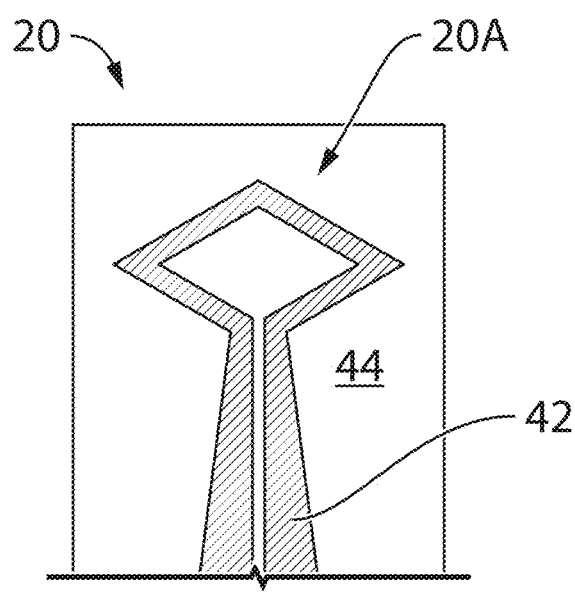
FIG. 3B is a top plan view of an exemplary tip of a microwave microscopy probe of the apparatus for inspecting the electrically-conductive mesh in the component.

FIG. 3B is a top plan view of an exemplary tip 20A of probe 20 of apparatus 10. In some embodiments, probe 20 can be configured as a printed coplanar waveguide (CPW) or microstrip-based probe of suitable type. In some embodiments, probe 20 can be an evanescent probe where electromagnetic radiation emitted by probe 20 does not propagate much farther than a distance corresponding to a wavelength of the radiation. In some embodiments, probe 20 can comprise a probe conductor 42 printed on a flexible (e.g., polyimide) film 44 serving as a planar substrate so that probe tip 20A can be resiliently biased against outer surface 14A of component 14 and permit relative sliding movement between probe tip 20A and component 14. The substrate (e.g., film 44) can be substantially non-electrically-conductive. In some embodiments, probe 20 can comprise a tapered waveguide. In some embodiments, probe 20 can comprise a balun designed according to the specifications provided in the following publication, which is incorporated herein by reference: B. Jackson et al., "Theory, design, and measurement of novel uniform circular antenna arrays for direction of arrival estimation," Defence Research and Development Canada, Scientific Report No.: DRDC-RDDC-2015-R010, January 2015.

The resilient biasing of probe tip 20A toward component 14 and the physical contact of probe tip 20A with outer surface 14A of component 14 can facilitate the maintaining of a constant separation distance between probe tip 20A and outer surface 14A without requiring active control of such separation distance. For example, probe 20 can be resiliently bent as shown in FIG. 1 during use so that the printed conductor in probe tip 20A is substantially parallel to outer surface 14A of component 14. Probe tip 20A can be kept in constant physical contact with outer surface 14A of component 14 as probe tip 20A is moved across outer surface 14A. Some curvature or other shape variations of outer surface 14A within the resilient (elastic) deformation range of probe 20 can also be accommodated by probe 20. In some embodiments, the spacing of the probe conductor 42 of probe tip 20A from outer surface 14A can be defined by a selected thickness of flexible film 44 on which the probe conductor 42 is printed. In some embodiments, flexible film 44 can have a thickness of about 0.005" (0.13 mm). In some embodiments, probe tip 20A can comprise an additional spacer disposed under probe tip 20A for physical engagement with outer surface 14A if desired.

In some embodiments, probe tip 20A can be of the short-circuited type to define a magnetic probe tip 20A. Accordingly, probe tip 20A can be configured to generate a magnetic field that interacts with component 14. As illustrated in FIGS. 3A and 3B, probe tip 20A can comprise a probe conductor 42 that defines a magnetic-field-concentrating or a magnetic-field-shaping feature. For example, probe tip 20A can comprise a conductor 42 that defines a two-dimensional shape that, when viewed from the top as illustrated in FIG. 3B, at least partially matches a two-dimensional shape of a portion of mesh 12 in order to shape a magnetic field generated by probe 20 based on the configuration of mesh 12. For example, probe tip 20A can define a two-dimensional shape that matches a majority of the two-dimensional shape of electrically-conductive loop 40 defined by the electrical conductor surrounding opening 38 of mesh 12. In some embodiments, probe tip 20A can define a two-dimensional shape that matches substantially the entire two-dimensional shape of electrically-conductive loop 40 defined by the electrical conductor surrounding opening 38 of mesh 12.

Figure 3C:
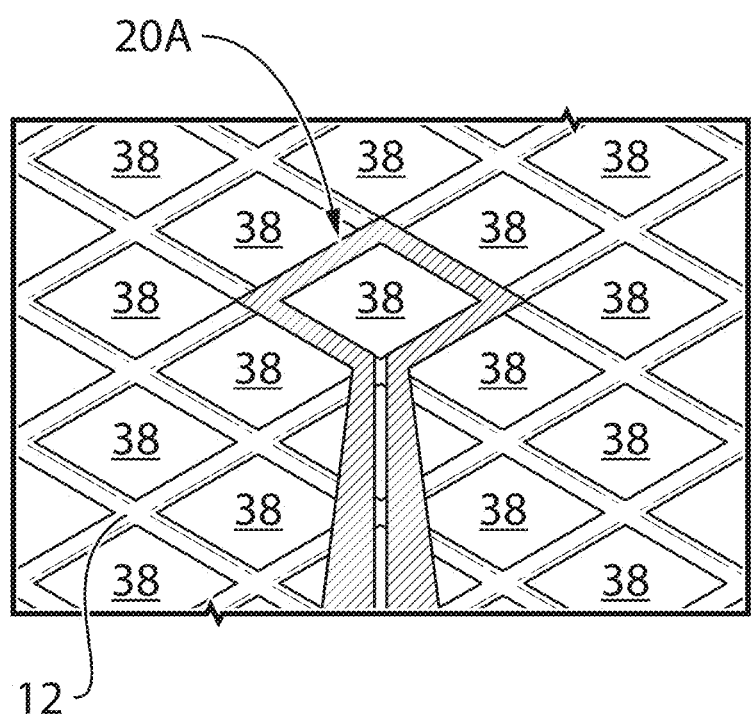
FIG. 3C is a schematic top plan view of the probe tip of FIG. 3B overlaying the mesh of FIG. 3A.

FIG. 3C is a schematic top plan view of probe tip 20A overlaying mesh 12. The matching of the shapes of probe tip 20A and of electrically-conductive loop 40 can facilitate magnetic (inductive) coupling between probe tip 20A and electrically-conductive loop 40 when probe tip 20A is adjacent component 14 and is positioned to be aligned with one of electrically-conductive loops 40. For example, the diamond shape of probe tip 20A can be generally of the same shape and size as the diamond shape of electrically-conductive loop 40 of mesh 12. It is understood that the matching of the shapes of probe tip 20A and of electrically-conductive loop 40 does not need to be exact but should provide magnetic coupling that is sufficient for the operation of apparatus 10 and the methods disclosed herein.

The matching shapes of probe tip 20A and electrically-conductive loop 40 can result in detectable variations in impedance and/or resonant frequency associated with probe 20 as probe tip 20A is slid across outer surface 14A of component 14 (e.g., along line L in FIG. 3A) and repeatedly magnetically couples and uncouples with successive adjacent electrically-conductive loops 40. For example, an impedance and/or a resonant frequency associated with probe 20 when probe tip 20A overlays and is aligned with one electrically-conductive loop 40 would be different from an impedance and/or a resonant frequency associated with probe 20 when probe tip 20A is disposed between (i.e., overlaps parts of) two adjacent electrically-conductive loops 40.

In various embodiments, probe tip 20A can be configured to generate a magnetic field that simultaneously interacts with a majority of one of electrically-conductive loops 40. In some embodiments probe tip 20A can be configured to generate a magnetic field that simultaneously interacts with substantially an entire electrically-conductive loop 40. In various embodiments, the two-dimensional shape defined by probe tip 20A can be a quadrilateral, a rhomboid or any other shape that substantially matches the shape of electrically-conductive loop 40 defining opening 38.

Figure 4A:
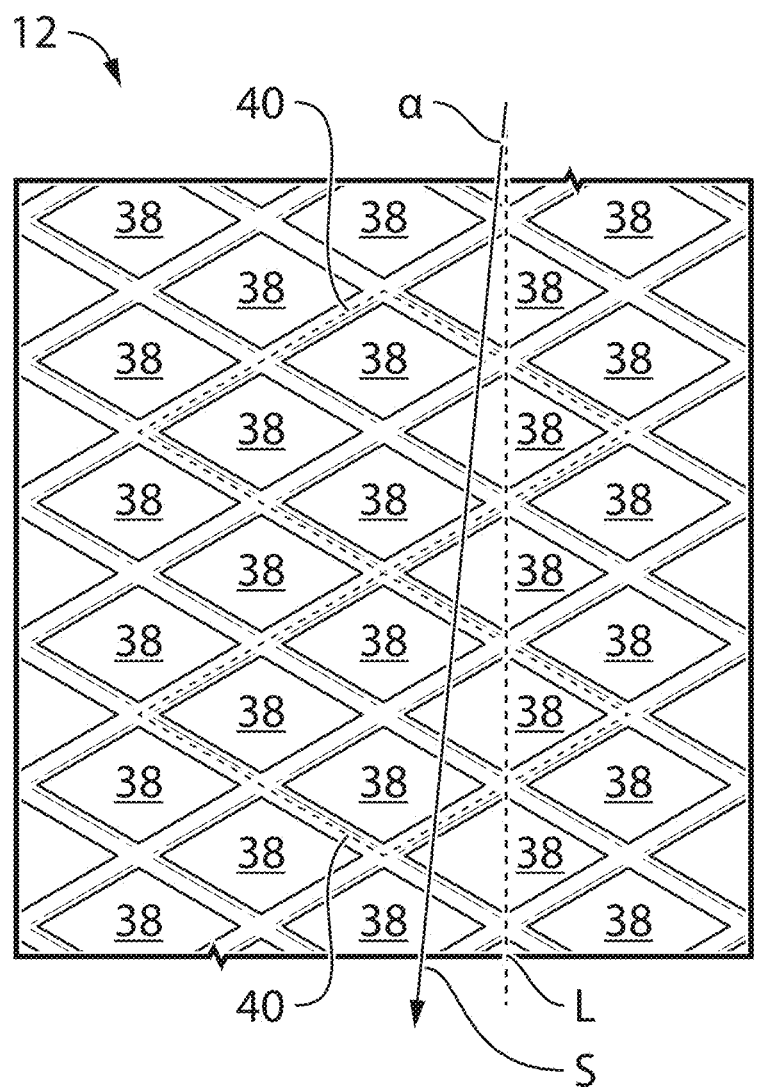
FIG. 4A is another top plan view of part of the exemplary electrically-conductive mesh, showing electrically-conductive loops that each surround a plurality of openings in the electrically-conductive mesh.

FIG. 4A is another top plan view of part of the exemplary electrically-conductive mesh 12 of FIG. 3A, showing two larger electrically-conductive loops 40 that surround a plurality of (e.g., four) openings 38 in electrically-conductive mesh 12.

Figure 4B:
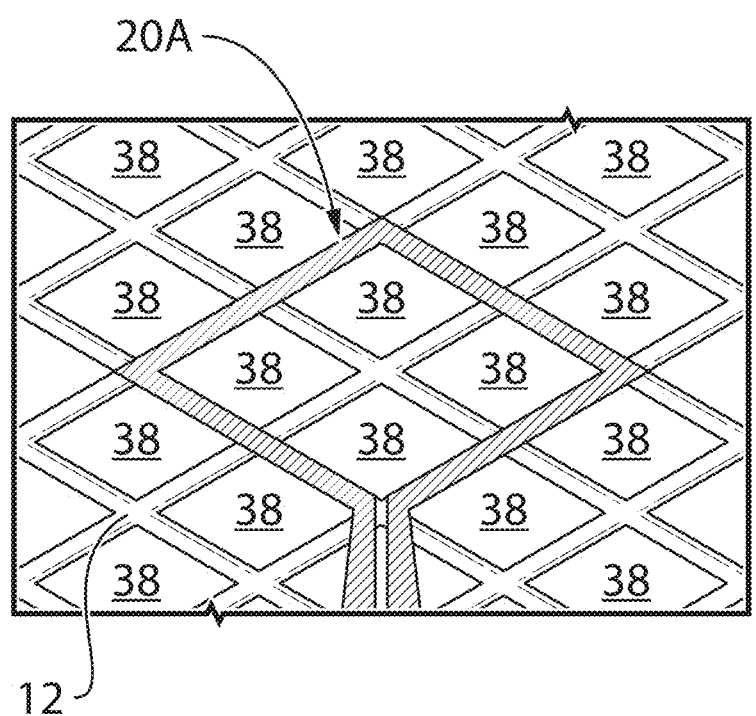
FIG. 4B is a schematic top plan view of another exemplary tip of a microwave microscopy probe of the apparatus for inspecting the electrically-conductive mesh in the component showing the probe overlaying the mesh of FIG. 4A.

FIG. 4B is a top plan view of another exemplary tip 20A of probe 20 of apparatus 10 for inspecting electrically-conductive mesh 12. Probe tip 20A is shown in FIG. 4B as overlaying mesh 12. Probe tip 20A of FIG. 4B can be constructed in the same manner and have the same general configuration as probe tip 20A of FIG. 3B. However, probe tip 20A of FIG. 4B can have a larger size so as to permit scanning of a larger portion of mesh 12 at one time. For example, probe tip 20A can have a size that permits magnetic coupling with a larger conductive loop 40 that surrounds a plurality of openings 38 as illustrated in FIG. 4A. The principle of operation of probe tip 20A of FIG. 4B can otherwise be identical to that of probe tip 20A of FIG. 3B. For example, the matching shapes of probe tip 20A and electrically-conductive loop 40 can result in detectable variations in impedance and/or resonant frequency associated with probe 20 as probe tip 20A is slid across outer surface 14A of component 14 (e.g., along line L in FIG. 4A) and repeatedly magnetically couples and uncouples with successive adjacent electrically-conductive loops 40 of larger size.

Figure 5:
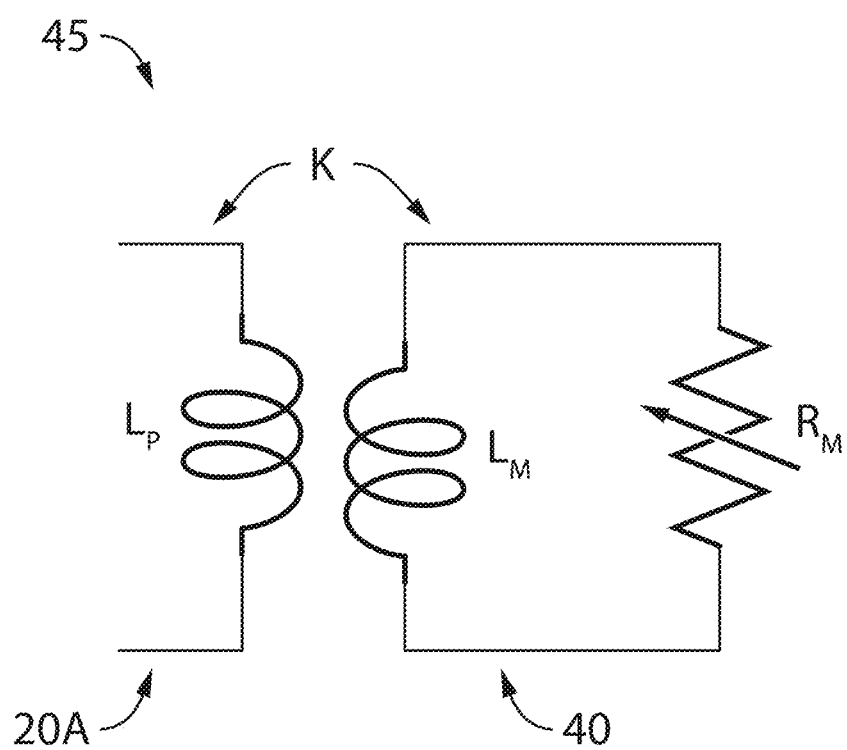
FIG. 5 is an exemplary equivalent circuit illustrating magnetic coupling between the tip of the microwave microscopy probe of FIG. 3C or 4B and the electrically-conductive mesh.

FIG. 5 is an exemplary equivalent circuit 45 illustrating magnetic coupling between probe tip 20A and an-electrically-conductive loop 40 of mesh 12 integrated with component 14. Left coil $L_P$ represents an inductance of probe tip 20A and right coil $L_M$ represents an inductance of the corresponding electrically-conductive loop 40 in mesh 12. Resistor $R_M$ represents the electrical resistance around the corresponding electrically-conductive loop 40 which probe tip 20A overlays.

The magnetic coupling between probe tip 20A and mesh 12 according to this exemplary circuit 45 can be used to detect a condition of mesh 12. Such condition can comprise a break or reduction in electrical conductivity around one of electrically-conductive loops 40 for example. In the case of an undamaged electrically-conductive loop 40, the value of resistance $R_M$ would be low. As probe tip 20A is slid over outer surface 14A and moves across different openings 38, the coupling coefficient K and the mutual inductance between probe tip 20A and mesh 12 would both oscillate as a function of the regular spacing of openings 38. The mutual inductance would have a peak value when the two-dimensional shape defined by probe tip 20A and the two-dimensional shape defined by electrically-conductive loop 40 are in alignment with each other. In this scenario, the impedance of the circuit including probe 20 will tend to be at a low value. A simple circuit analogy to the magnetic coupling of probe tip 20A and mesh 12 under this condition would be a transformer with its secondary shorted.

On the other hand, a minimal coupling coefficient K would occur when the center of the two-dimensional shape defined by probe tip 20A is halfway between two openings 38 or, in other words, when the two-dimensional shape of probe tip 20A is farthest from being aligned with an electrically-conductive loop 40. In this situation, the impedance of the circuit including probe 20 would be at a high value.

As probe tip 20A is slid across outer surface 14A along line L for example, characteristics of equivalent circuit 45 illustrated in FIG. 5 would change as probe tip 20A moves over successive openings 38. Accordingly, detector 24 can be configured to detect one or more of such characteristics associated with probe 20 at different relative positions of probe tip 20A and component 14 where such one or more characteristics defines a pattern related to the regularly-spaced openings 38 (or other features) of mesh 12. An irregularity in the pattern of detected characteristics that is inconsistent with the expected layout of regularly-spaced features of mesh 12 can be indicative of a change in the condition of mesh 12 at the corresponding position. Such change in condition can, for example, be an electrical discontinuity such as a cut wire or strand in mesh 12, a reduction in electrical conductivity in loop 40 or a deformation of mesh 12 where the two-dimensional shape of the corresponding loop 40 is not what it should be.

In reference to FIG. 5, an electrical discontinuity in loop 40 would cause a significant increase in the value of $R_M$ when the two-dimensional shape of probe tip 20A is aligned with the two-dimensional shape of loop 40 compared to when electrically-conductive loop 40 is undamaged. Such change in the value of $R_M$ can entail a corresponding change in resonant frequency of the circuit including probe 20 and such change can be detected by detector 24 so that an unexpected change in resonant frequency (i.e., an irregularity in the pattern related to the spacing of openings 38) can be correlated to damage to mesh 12 and appropriate corrective action (e.g., repair) can be taken.

FIG. 6A is a schematic perspective view of another exemplary embodiment of apparatus 10. In this embodiment, apparatus 10 can be integrated into a portable handheld device 46 suitable to be moved (e.g., slid, scanned) across outer surface 14A of component 14. It is understood that device 46 can also be integrated with a motion system such as a computer numerical control (CNC) motion system or a robotic system which can be used to control the movement of apparatus 10. Alternatively, it is understood that apparatus 10 could be held stationary while component 14 is moved relative to apparatus 10 to achieve relative (e.g., translation) movement between apparatus 10 and component 14.

Portable handheld device 46 can comprise handle 48 configured to be grasped by a hand of a user and used to move device 46 across outer surface 14A of component 14 along scanning direction S for example, while probe(s) 20 each generate radio-frequency electromagnetic radiation that interacts with component 14. Device 46 can comprise one or more members 49 for engaging with outer surface 14A of component and supporting device 46 against component 14 during scanning. In some embodiments, member(s) 49 can comprise one or more wheels and/or one or more low-friction pads for interacting with outer surface 14A. In some embodiments, device 46 can comprise a plurality of probes 20 as described herein configured to generate radio-frequency electromagnetic radiation for interaction with mesh 12 of component 14.

Figure 6B:
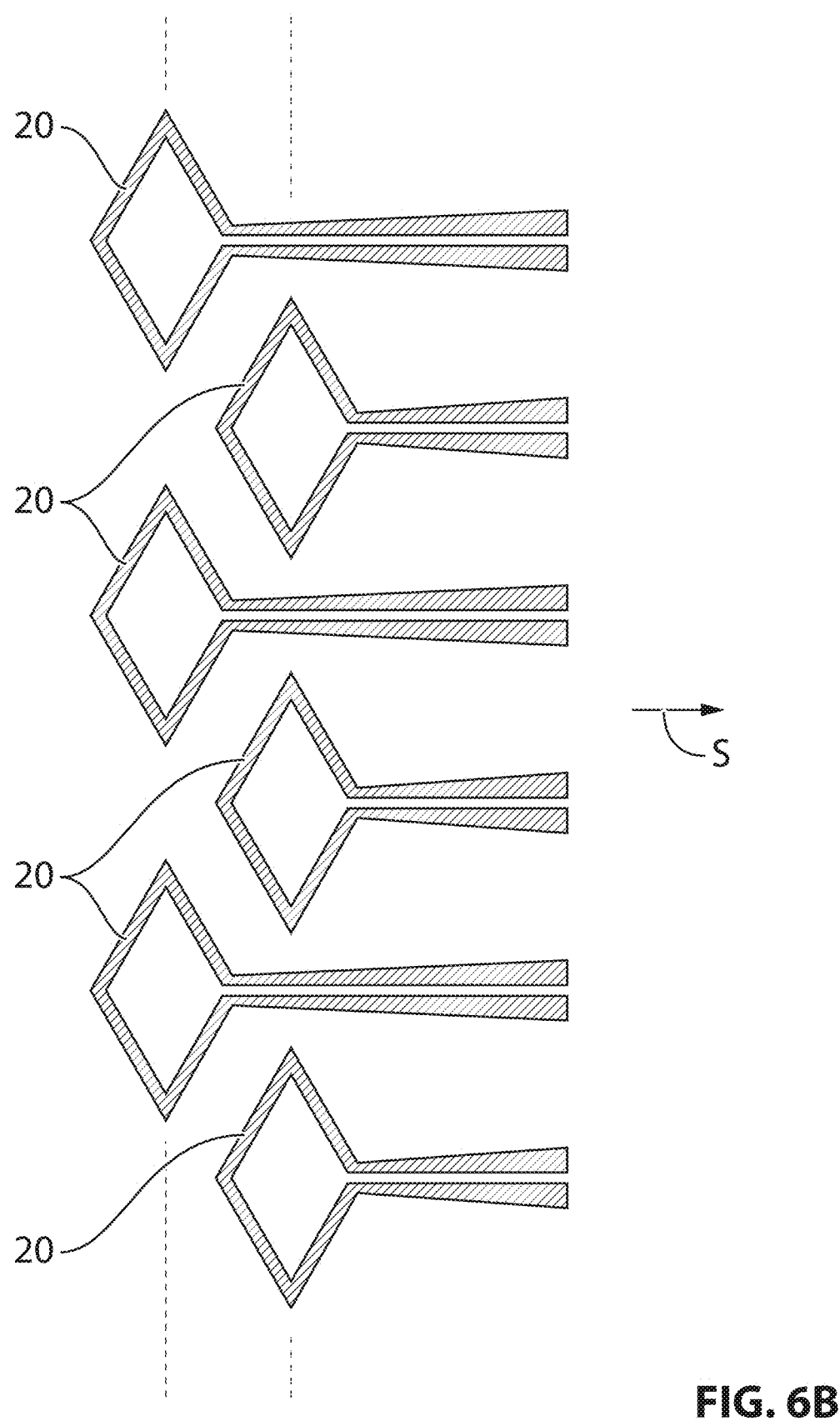
FIG. 6B shows an exemplary arrangement of microwave microscopy probes suitable for the apparatus of FIG. 6A.

FIG. 6B shows an exemplary arrangement of probes 20 suitable for device 46 of FIG. 6A. In some embodiments, the geometric layout of the multiple probes 20 can be arranged to substantially correspond to the configuration of mesh 12. The use of an arrangement of multiple probes 20 as opposed to a single probe 20 can be used to inspect a larger region of component 14 when device 46 is in one position and conduct quicker inspections of larger regions where the multiple probes 20 would interact with respective (e.g., adjacent) electrically-conductive loops 40. In various embodiments, the multiple probes 20 could be activated simultaneously or separately depending on the arrangement of probes 20 with RF source(s) 22 and detector(s) 24. As explained above, detector 24 can be configured to provide output 26 (e.g., visual and/or aural indication) indicative of a defect having been found in mesh 12. In various embodiments, the plurality of probes 20 can be provided on a common flexible substrate or on separate flexible substrates.

In some embodiments, device 46 can also comprise position sensor 50 (see FIG. 6A) so that a position of device 46 and/or of one or more of probes 20 can be tracked and that characteristics detected by detector(s) 24 can be associated with corresponding positions on component 14. In some embodiments, position sensor 50 can comprise a suitable accelerometer. In some embodiments, position sensor 50 and detector(s) 24 can be operatively connected so that characteristics detected by detector 24 can be associated with respective positions of device 46. In some embodiments, output 26 can be indicative of a detected defect in mesh 12 together with an associated position so that the location of the defect can be identified on component 14 and appropriate corrective action(s) can be taken.

Figure 7:
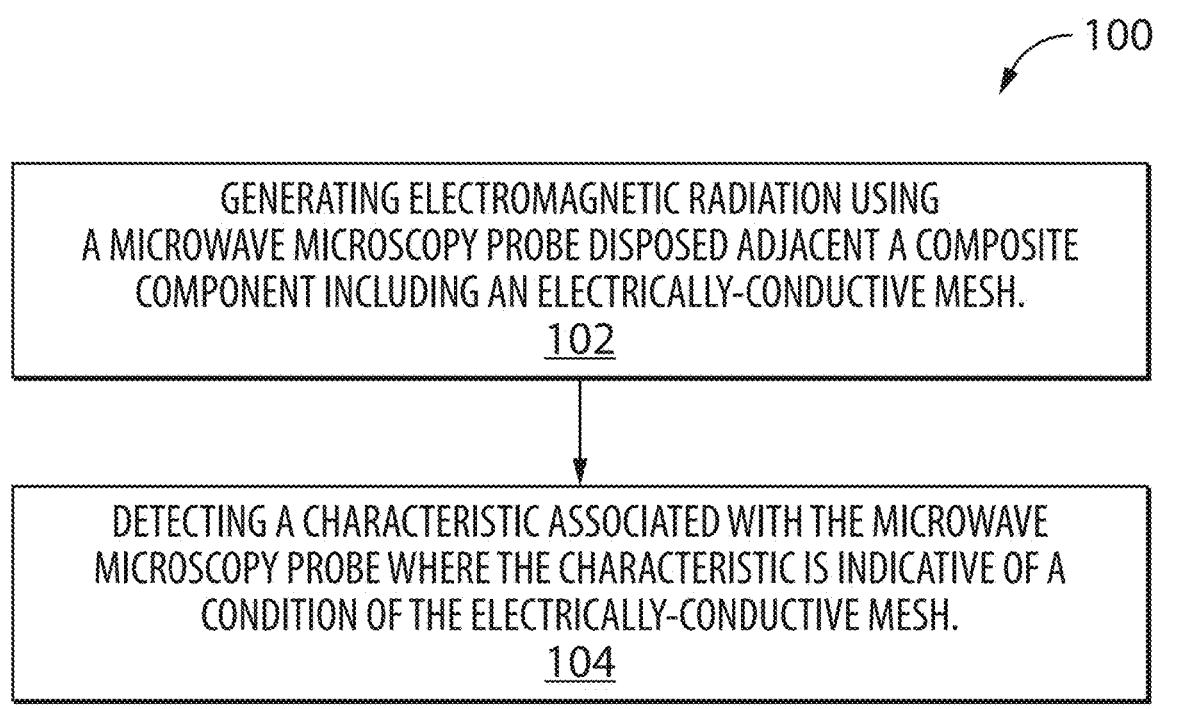
FIG. 7 is a flowchart illustrating a method for inspecting an electrically-conductive mesh in a composite component using microwave microscopy.

FIG. 7 is a flowchart illustrating a method 100 for inspecting electrically-conductive mesh 12 in composite component 14 using microwave microscopy. In various embodiments, method 100 can be conducted using apparatus 10 as described herein or with another suitable microwave microscopy apparatus. Aspects of apparatus 10 and of other methods described herein can also apply to method 100. In various embodiments, method 100 can comprise: generating radio-frequency electromagnetic radiation using microwave microscopy probe 20 disposed adjacent composite component 14 so that the radio-frequency electromagnetic radiation interacts with electrically-conductive mesh 12 in composite component 14 (see block 102); and detecting a characteristic associated with microwave microscopy probe 20 when the radio-frequency electromagnetic radiation is interacting with electrically-conductive mesh 12, the characteristic being indicative of a condition of electrically-conductive mesh 12 (see block 104).

In some embodiments, method 100 can comprise sequentially causing the radio-frequency electromagnetic radiation to interact with different portions of electrically-conductive mesh 12 in composite component 14. The different portions can be associated with different relative positions of microwave microscopy probe 20 and composite component 14 so that the different portions span over a plurality of the regularly-spaced features (e.g., see openings 38 in FIG. 3A) of electrically-conductive mesh 12. The characteristic associated with microwave microscopy probe 20 can be detected at each of the different relative positions of composite component 14 and microwave microscopy probe 12. The detected characteristics can define a pattern related to the regularly-spaced features of electrically-conductive mesh 12. An irregularity in the pattern defined by the detected characteristics can be indicative of damage to the portion of electrically-conductive mesh 12 corresponding to the irregularity in the pattern. The damage to the corresponding portion of electrically-conductive mesh can comprise an electrical discontinuity in a portion of mesh 12.

In situations where the regularly-spaced features comprise electrical conductors defining electrically-conductive loops 40 each outlining a respective opening 38 and/or each surrounding a plurality of openings 38, method 100 can comprise generating a magnetic field using microwave microscopy probe 20 so that the magnetic field simultaneously interacts with a majority of one of conductive loops 40. In some embodiments, the generated magnetic field can simultaneously interact with substantially the entire one of conductive loops 40.

Method 100 can comprise causing relative movement between microwave microscopy probe 20 and composite component 14 to the different relative positions while microwave microscopy probe 20 is in physical contact with composite component 14. In some embodiments of method 100, microwave microscopy probe 20 can be resiliently biased against composite component 14.

Method 100 can comprise causing relative movement between microwave microscopy probe 20 and composite component 14 in a direction that is oblique to a row (or column) in which the regularly-spaced features such as openings 38 lie.

In situations where the detected pattern exhibits a shift between two or more of the portions of electrically-conductive mesh 12, such a shift can be indicative of a change in depth of electrically-conductive mesh 12 from outer surface 14A of composite component 14. Such a change in depth can be indicative of a change in thickness T of paint layer(s) 18 overlaying electrically-conductive mesh 12. The paint thickness T overlaying mesh 12 can also be an important factor in the lightning protection capability provided by mesh 12. For example, if paint layer(s) 18 overlaying a portion of mesh 12 is excessively thick, this could potentially cause some local attachment of the lightning and consequently cause localized heating and potentially damage component 14 in the event of a lightning strike.

Method 100 can comprise generating a magnetic field using microwave microscopy probe 20 so that the magnetic field interacts with electrically-conductive mesh 12 in composite component 14. Accordingly, microwave microscopy probe 20 can be magnetically coupled to electrically-conductive mesh 12. In cases where electrically-conductive mesh 12 comprises opening 38 outlined by an electrical conductor defining electrically-conductive loop 40, the generated magnetic field can simultaneously interact with a majority of conductive loop 40. In some embodiments, the generated magnetic field can simultaneously interact with substantially the entire conductive loop 40.

In various embodiments of method 100, the characteristic associated with microwave microscopy probe 20 can comprise a resonant frequency.

Figure 8:
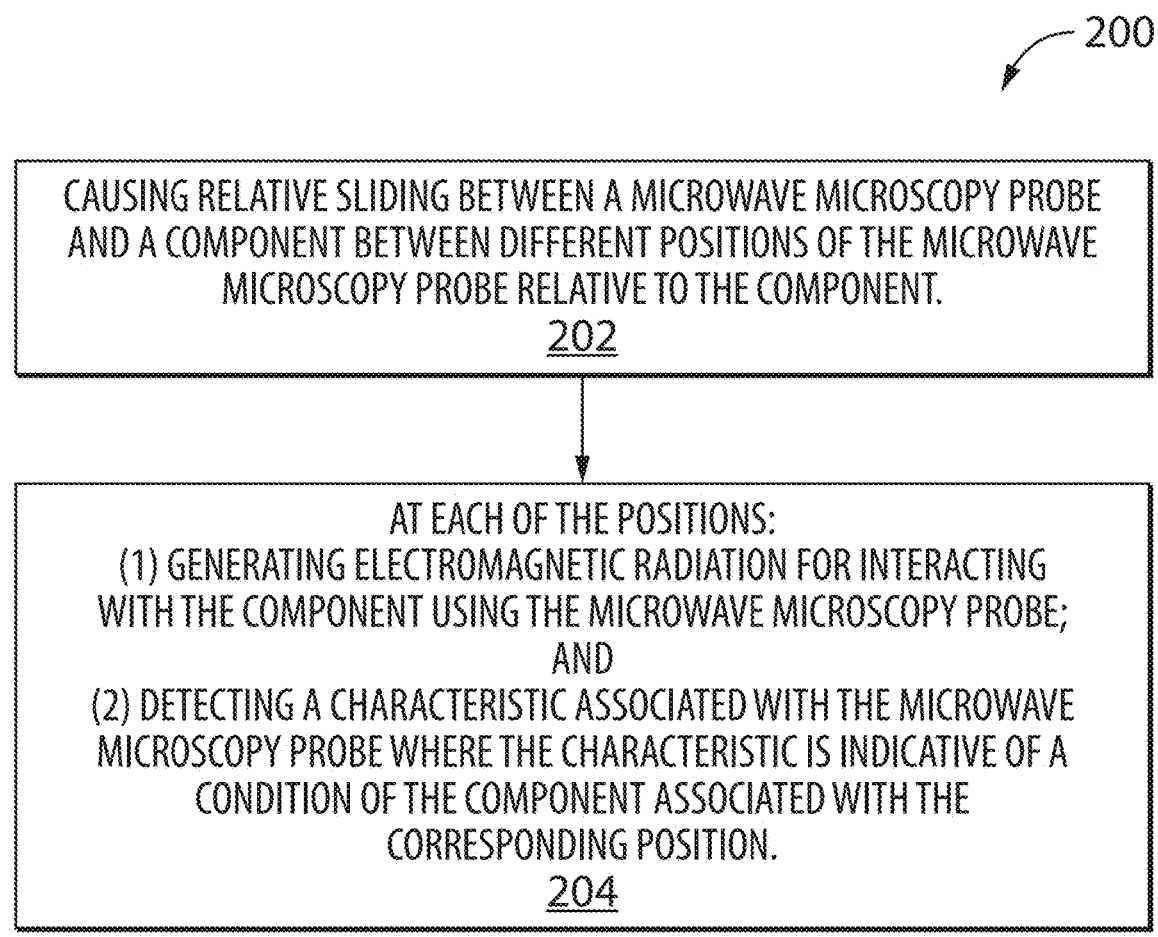
FIG. 8 is a flowchart illustrating a method for inspecting a component using microwave microscopy.

FIG. 8 is a flowchart illustrating a method for inspecting a component using microwave microscopy. In various embodiments, method 200 can be conducted using apparatus 10 as described herein or with another suitable microwave microscopy apparatus. Aspects of apparatus 10 and of other methods described herein can also apply to method 200. In various embodiments, method 200 can comprise: causing relative sliding between microwave microscopy probe 20 and component 14 between different positions of microwave microscopy probe 20 relative to component 14 (see block 202); and at each of the positions:
generating radio-frequency electromagnetic radiation for interacting with component 14 using microwave microscopy probe 20; and
detecting a characteristic associated with microwave microscopy probe 20 when the radio-frequency electromagnetic radiation is interacting with component 14, the characteristic being indicative of a condition of component 14 associated with the corresponding position (see block 204).

In some embodiments, method 200 can comprise resiliently biasing microwave microscopy probe 20 against component 14 while causing the relative sliding. The characteristic associated with microwave microscopy probe 20 can comprise a resonant frequency.

In some embodiments, method 200 can comprise generating a magnetic field for interacting with electrically-conductive mesh 12 in component 14 using microwave microscopy probe 20.

EXAMPLE 1

Simulation

Figure 9:
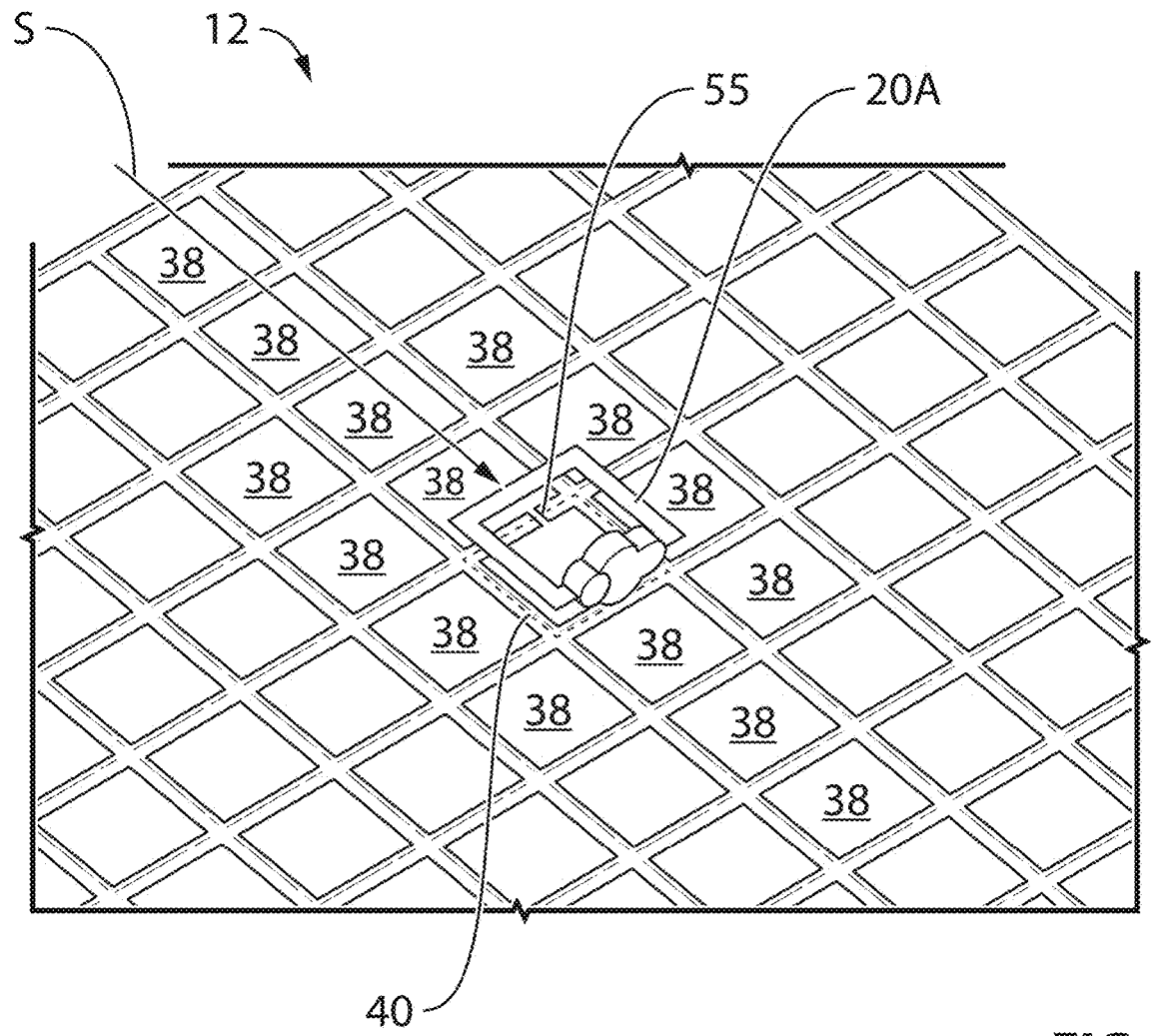
FIG. 9 is a perspective view of an exemplary virtual electrically-conductive mesh for simulating the operation of the apparatus for inspecting the electrically-conductive mesh in the component.

FIG. 9 is a perspective view of an exemplary virtual electrically-conductive mesh 12 used for numerical simulation of the operation of apparatus 10. The simulation was conducted using a commercial electromagnetic simulation software. Mesh 12 was modeled as an electrically-conductive grid having square-shaped openings 38. The period of openings 38 was set to 1 mm and the thickness of the mesh 12 was set to 200 µm. A virtual short-circuited magnetic probe tip 20A defining a square two-dimensional shape that substantially matched the square shape of electrically-conductive loops 40 outlining openings 38 was used. Probe tip 20A was moved along a row of openings 38 along scanning direction S and the input impedance of probe 20 was determined at different positions of probe tip 20A relative to mesh 12.

Figure 10:
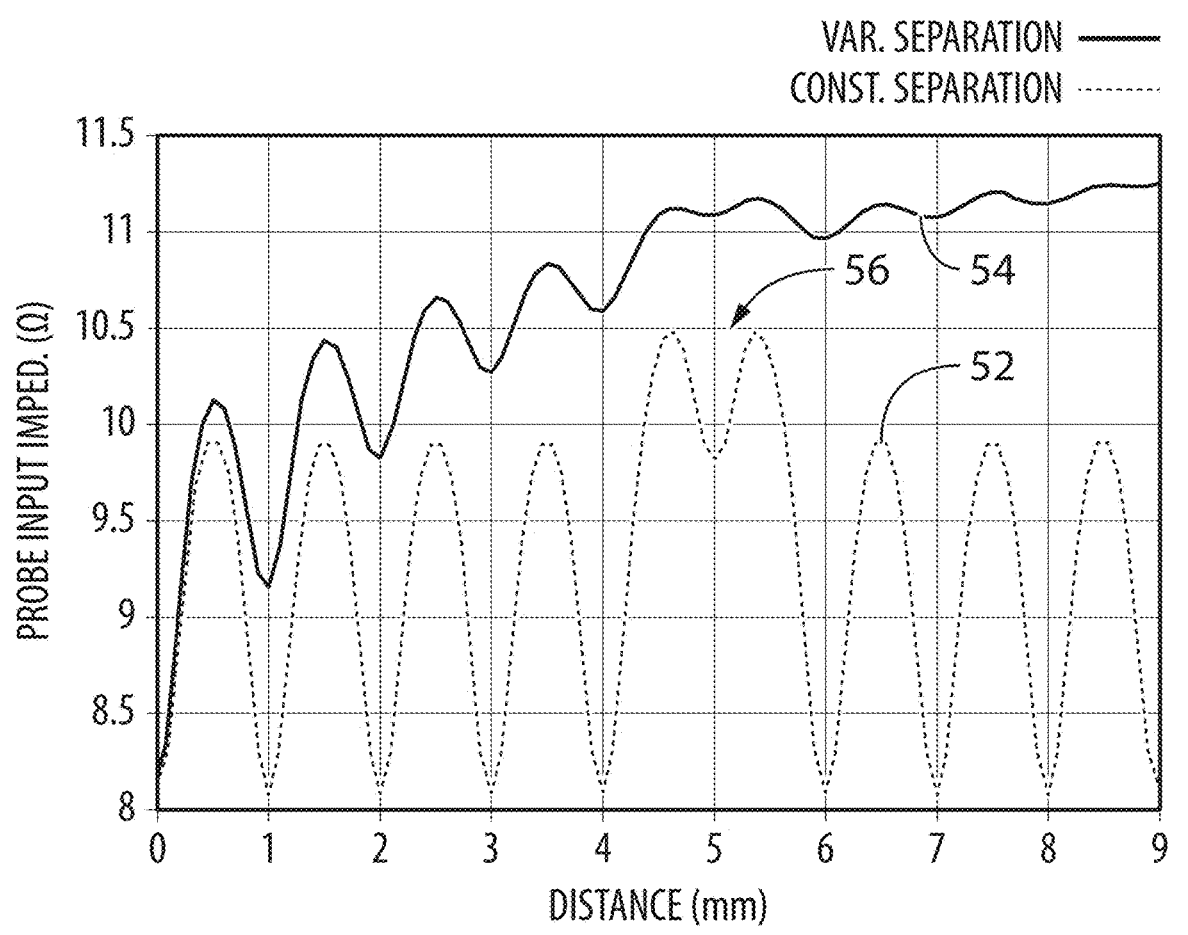
FIG. 10 is a graph illustrating exemplary patterns of characteristics obtained from the simulation of the operation of the apparatus.

FIG. 10 is a graph illustrating two exemplary plots 52 and 54 of input impedance of probe 20 detected during the simulation illustrated in FIG. 9 as a function of distance along line S. Plot 52 represents a pattern of the input impedance magnitude Ω of probe 20 as probe tip 20A was moved along scanning direction S while keeping a constant separation distance of probe tip 20A above mesh 12 of 0.127 mm (0.005 in). At every 1 mm, probe tip 20A was aligned with a square electrically-conductive loop 40 which resulted in the input impedance magnitude Ω being at a minimum value. Conversely, the input impedance magnitude Ω reached a maximum value at positions 0.5 mm farther along scanning direction S as probe tip 20A was half way between two openings 38.

In order to simulate a defect, a strand of virtual mesh 12 was cut to define a 100 µm gap 55 in a loop 40 located at a distance of 5 mm. In reference to FIG. 10, this defect is represented by irregularity 56 shown in plot 52 at the distance of 5 mm where the input impedance of probe 20 is close to 10Ω instead of 8Ω for all the other undamaged electrically-conductive loops 40 scanned by probe tip 20A.

Plot 54 represents a pattern of the input impedance magnitude Ω of probe 20 as probe tip 20A was moved along scanning direction S while progressively increasing the separation distance between probe tip 20A and mesh 12. Plot 54 also exhibited peaks and valleys of input impedance magnitude Ω at the same positions as those of the pattern of plot 52 and were related to the regularly-spaced openings 38 but the values of the peaks and valleys were different from those in plot 52. The progressive increase in separation distance caused an upward shift in the pattern of plot 54 where the average input impedance increased as the separation distance between probe tip 20A and mesh 12 increased. The increased in separation distance also caused some attenuation of the changes in input impedance demonstrated by the amplitude of the oscillations in plot 54 decreasing as separation distance increased. It was determined that the shift and attenuation exhibited in plot 54 compared to plot 52 were related to the separation distance between probe tip 20A and mesh 12 and that consequently, such characteristics could be indicative of thickness T of paint layer(s) 18 overlaying mesh 12 in an actual component 14.

EXAMPLE 2

Experiment

Figure 11:
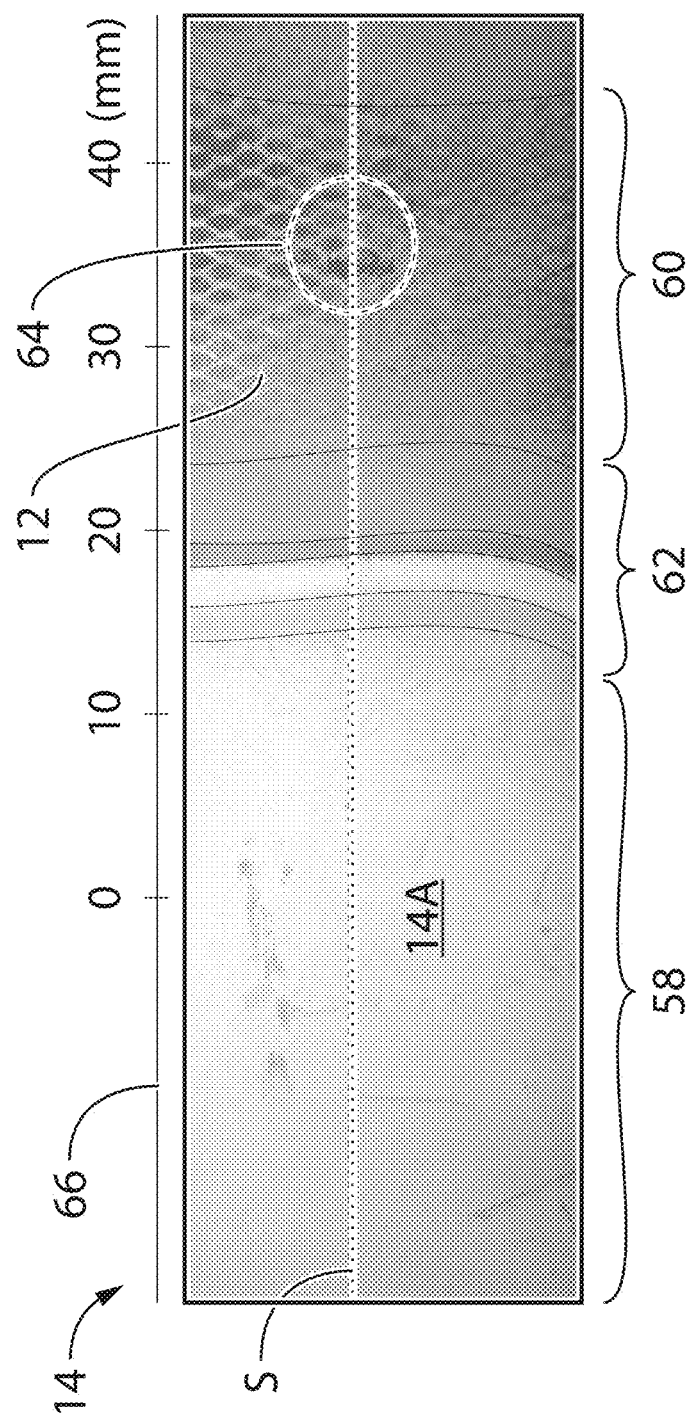
FIG. 11 is a top plan view of an experimental composite component comprising an electrically-conductive mesh that is partially exposed.

FIG. 11 is a top plan view of an experimental composite component 14 comprising electrically-conductive mesh 12 that was partially exposed for the purpose of testing the operation of apparatus 10. Experimental component 14 comprised painted region 58, unpainted region 60 where paint layers 18 were removed to expose mesh 12 and transition region 62 where paint thickness T gradually decreased from painted region 58 to unpainted region 60. FIG. 11 also includes line S along which probe tip 20A was scanned across component 14 during testing. Probe tip 20A was moved from painted region 58 to unpainted region 60. Unpainted region 60 included damaged region 64 of mesh 12 in which an electrical discontinuity in mesh 12 was intentionally produced for the purpose of experimentation. Line S was selected to intersect the electrical discontinuity in damaged region 64. Scale 66 is also displayed in FIG. 11 to facilitate the interpretation of the results of the experiment presented in FIG. 12. Transition region 62 extended from about 11 mm to about 25 mm along scale 66.

Experimental composite component 14 was manufactured using a conventional layup process for producing CFRP parts. Mesh 12 was of expanded copper foil (ECF) type having a thickness of 50.8 μm. The corresponding diamond-shaped mesh size was 3.1 mm×1.42 mm. Painted region 58 included a thickness of 300 μm of non-conductive paint layers 18 overlaying mesh 12. Unpainted region 60 was sanded in order to remove paint layers 18 and thereby expose mesh 12. A complete diamond-shaped opening 38 (see FIG. 3A) was removed from damaged region 64 in order to intentionally provide a defect in mesh 12.

Figure 12:
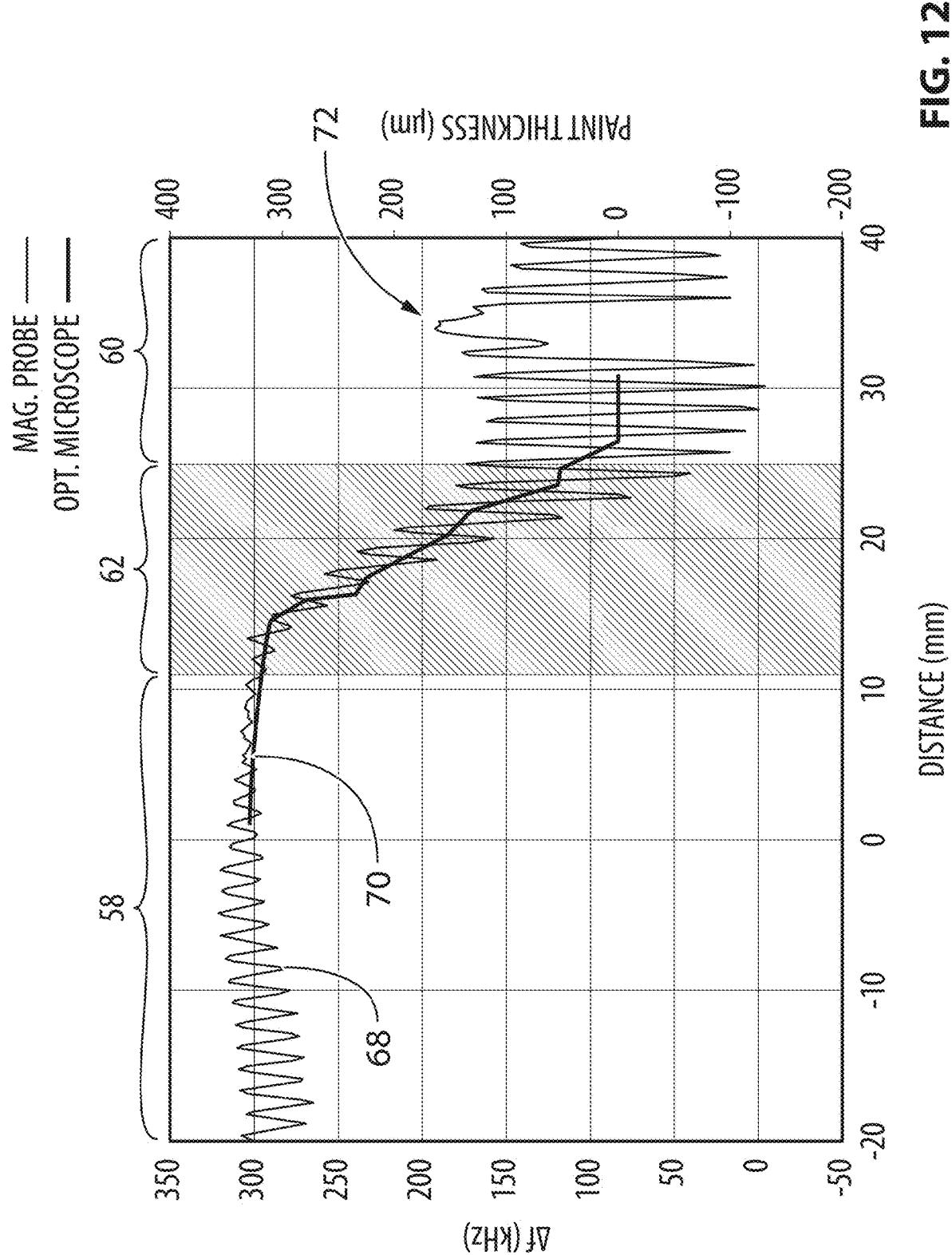
FIG. 12 is a graph illustrating an exemplary pattern of characteristics detected using the apparatus for inspecting the electrically-conductive mesh in the component during an inspection of the experimental composite component of FIG. 11.

FIG. 12 is a graph illustrating an exemplary pattern of characteristics detected using the apparatus 10 when scanned along line S across of experimental composite component 14 of FIG. 11. The horizontal axis (abscissa) of the graph represents the position of probe tip 20A along line S in relation to scale 66 in FIG. 11. The left-hand vertical axis (ordinate) represents a change in resonant frequency (Δf) relative to a baseline resonant frequency. The right-hand vertical axis (ordinate) represents a thickness of the paint disposed above mesh 12. Plot 68 illustrates a pattern of resonant frequency shifts acquired using apparatus 10 at a plurality of positions as probe tip 20A configured as shown in FIG. 3B was slid across component 14. Plot 68 is associated with the left-hand vertical axis and represents changes in resonant frequency (Δf) relative to the baseline resonant frequency. Plot 70 illustrates the paint thickness T along line S as measured using an optical microscope and is associated with the right-hand vertical axis.

The use of a frequency-following circuit and a lock-in amplifier in a feedback loop to lock the resonant frequency of a resonator could have been used where detected resonant frequency shifts (Δf) could have allowed the mapping of changes of sample properties and topology. In this experiment however, network analyzer 28 was set to operate in a frequency band centered on 1 GHz as a baseline frequency and over a 1 MHz span while probe tip 20A was scanning component 14. The span width of 1 MHz was chosen to include only one of the resonances in the Fabry Perot circuit/assembly including probe 20. A 3.2 m long segment of low-loss coaxial line was used as resonator 32. The reflection coefficient curve was recorded by software executed by network analyzer 28 every time probe 20 moved to a new position. In a post-processing stage, changes in resonant frequency across experimental component 14 were derived from the recorded data.

In reference to FIG. 12, oscillations (i.e., variations in resonant frequency) in plot 68 are visible in painted region 58, in unpainted region 60 and in transition region 62. The oscillations were related to the regularly-spaced diamond-shaped openings 38 in mesh 12 and the grid pattern of mesh 12 was distinguishable in plot 68. The missing diamond-shaped opening 38 in mesh 12 was also distinguishable in plot 68 by way of irregularity 72 where the pattern of regular oscillations was disrupted due to the defect in mesh 12. The difference in electrical conductivity of mesh 12 in damaged region 64 compared to other regions of mesh 12 disrupted the pattern of resonant frequencies associated with probe 20 and related to the regularly-spaced openings 38 in mesh 12. The detection of such disruption can be made by software and the process of detecting a defect in mesh 12 can be automated.

As predicted by the simulation results shown in FIG. 10, the change in separation distance between probe tip 20A and mesh 12 caused by the change in paint thickness T from painted region 58 to unpainted region caused a shift in plot 68 where the average resonant frequency went from about 300 kHz in painted region 58 to under 100 kHz in unpainted region 60 as the separation distance was reduced. Plot 70 is plotted against plot 68 to illustrate the correlation between the shift exhibited in plot 68 and the actual paint thickness T overlaying mesh 12. In some embodiments, the detection of such shift in the average resonant frequency can be correlated to a paint thickness value or to a depth of mesh 12 below outer surface 14A. In some embodiments, such detection can be automated using software.

The amplitude increase in the oscillations of plot 68 also demonstrated an attenuation caused by paint layers 18 overlaying mesh 12. The increased distance between probe tip 20A and mesh 12 due to paint thickness T caused a corresponding decrease in coupling coefficient K (shown in FIG. 5) which was reflected by a decrease in amplitude of the oscillations. In some embodiments, the detection of such change in amplitude in the oscillations can correlated to a paint thickness value or to a depth of mesh 12 below outer surface 14A. In some embodiments, such detection can be automated using software.

A modulation effect that was noted in FIG. 12 is with the amplitude of the oscillations within painted region 58 and also within unpainted region 60. Since the separation distances were constant within painted region 58 and also within unpainted region 60, the changes in amplitude in those regions is believed to be due to misalignment of the path of motion of probe tip 20A with the row (or column) of openings 38. In reference to FIG. 3A, the path of probe tip 20A followed scanning direction S at an oblique non-zero angle α relative to line L of the row/column of openings 38. Despite the modulation effect, the oscillations were still related to the regular spacing of openings 38 and irregularity 72 was still detectable within the pattern represented in plot 68. This shows that the direction of motion of probe tip 20A may not necessarily be aligned with the row of openings 38 in order to obtain meaningful results.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for inspecting an electrically-conductive mesh in a composite component using microwave microscopy, the method comprising:
    generating radio-frequency electromagnetic radiation using a microwave microscopy probe disposed adjacent the composite component so that the radio-frequency electromagnetic radiation interacts with the electrically-conductive mesh in the composite component; and
    detecting a characteristic associated with the microwave microscopy probe when the radio-frequency electromagnetic radiation is interacting with the electrically-conductive mesh, the characteristic being indicative of a condition of the electrically-conductive mesh.

2. The method as defined in claim 1, comprising:
    sequentially causing the radio-frequency electromagnetic radiation to interact with different portions of the electrically-conductive mesh in the composite component, the different portions being associated with different relative positions of the microwave microscopy probe and the composite component, the different portions spanning over a plurality of regularly-spaced features of the electrically-conductive mesh;
    detecting the characteristic associated with the microwave microscopy probe at each of the different relative positions of the composite component and the microwave microscopy probe, the detected characteristics defining a pattern related to the regularly-spaced features of the electrically-conductive mesh; and
    detecting an irregularity in the pattern defined by the detected characteristics, the irregularity being indicative of damage to the portion of the electrically-conductive mesh corresponding to the irregularity.

3. The method as defined in claim 2, wherein the regularly-spaced features comprise openings, each opening being outlined by an electrical conductor defining an electrically-conductive loop, the method comprising generating a magnetic field using the microwave microscopy probe, the magnetic field simultaneously interacting with a majority of one of the conductive loops.

4. The method as defined in claim 2, wherein the regularly-spaced features comprise electrical conductors defining electrically-conductive loops, the method comprising generating a magnetic field using the microwave microscopy probe, the magnetic field simultaneously interacting with a majority of one of the conductive loops.

5. The method as defined in claim 3, wherein the magnetic field simultaneously interacts with substantially the entire one of the conductive loops.

6. The method as defined in claim 2, wherein the damage to the corresponding portion of the electrically-conductive mesh comprises an electrical discontinuity.

7. The method as defined in claim 2, wherein the pattern defined by the detected characteristics exhibits a shift indicative of a change in depth of the electrically-conductive mesh from a surface of the composite component.

8. The method as defined in claim 2, wherein the pattern defined by the detected characteristics exhibits a shift indicative of a change in thickness of a paint overlaying the electrically-conductive mesh.

9. The method as defined in claim 2, comprising causing relative movement between the microwave microscopy probe and the composite component in a direction that is oblique to a row or column in which the regularly-spaced features lie.

10. The method as defined in claim 1, comprising causing relative movement between the microwave microscopy probe and the composite component while the microwave microscopy probe is in contact with the composite component.

11. The method as defined in claim 1, comprising causing relative movement between the microwave microscopy probe and the composite component while the microwave microscopy probe is resiliently biased against the composite component.

12. The method as defined in claim 1, comprising generating a magnetic field using the microwave microscopy probe, the magnetic field interacting with the electrically-conductive mesh in the composite component.

13. The method as defined in claim 12, wherein the electrically-conductive mesh comprises an electrical conductor defining an electrically-conductive loop, the magnetic field simultaneously interacting with a majority of the electrically-conductive loop.

14. The method as defined in claim 12, wherein the electrically-conductive mesh comprises an electrical conductor defining an electrically-conductive loop, the magnetic field simultaneously interacting with substantially the entire conductive loop.

15. The method as defined in claim 13, wherein the condition of the electrically-conductive mesh comprises an electrical discontinuity in the electrically-conductive loop.

16. The method as defined in claim 1, comprising magnetically coupling the microwave microscopy probe to the electrically-conductive mesh.

17. The method as defined in claim 1, wherein the characteristic associated with the microwave microscopy probe comprises a resonant frequency.

18. A method for inspecting a component using microwave microscopy, the method comprising:
    causing relative sliding between a microwave microscopy probe and the component between different positions of the microwave microscopy probe relative to the component;
    at each of the positions:

generating radio-frequency electromagnetic radiation for interacting with the component using the microwave microscopy probe; and detecting a characteristic associated with the microwave microscopy probe when the radio-frequency electromagnetic radiation is interacting with the component, the characteristic being indicative of a condition of the component associated with the corresponding position; and generating a magnetic field for interacting with an electrically-conductive mesh in the component using the microwave microscopy probe.

19. The method as defined in claim 18, comprising resiliently biasing the microwave microscopy probe against the component while causing the relative sliding.

20. The method as defined in claim 18, wherein the characteristic associated with the microwave microscopy probe comprises a resonant frequency.

21. An apparatus for inspecting an electrically-conductive mesh in a composite component, the electrically-conductive mesh comprising an electrical conductor defining an electrically-conductive loop, the apparatus comprising:
 a radio-frequency source; and
 a microwave microscopy probe operatively connected to the radio-frequency source and configured to generate radio-frequency electromagnetic radiation for interaction with the electrically-conductive mesh in the composite component, the microwave microscopy probe comprising a tip shaped to magnetically couple with a majority of the electrically-conductive loop defined by the electrical conductor of the electrically-conductive mesh.

22. The apparatus as defined in claim 21, wherein the tip is shaped to magnetically couple with substantially the entire electrically-conductive loop defined by the electrical conductor.

23. The apparatus as defined in claim 21, wherein the tip defines a two-dimensional shape that substantially matches a majority of a two-dimensional shape of the electrically-conductive loop defined by the electrical conductor.

24. The apparatus as defined in claim 21, wherein the tip defines a two-dimensional shape that substantially matches an entirety of a two-dimensional shape of the electrically-conductive loop defined by the electrical conductor.

25. The apparatus as defined in claim 23, wherein the two-dimensional shape of the tip substantially defines a quadrilateral.

26. The apparatus as defined in claim 23, wherein the two-dimensional shape of the tip substantially defines a rhomboid.

27. The apparatus as defined in claim 21, wherein the microwave microscopy probe is configured to be resiliently biased against the component.

28. The apparatus as defined in claim 21, wherein the microwave microscopy probe comprises a probe conductor printed on a film.

29. The apparatus as defined in claim 21, comprising a sensor configured to track a position of the microwave microscopy probe.

30. The apparatus as defined in claim 21, comprising a detector configured to generate an output indicative of a resonant frequency associated with the microwave microscopy probe.

31. The apparatus as defined in claim 21, comprising a plurality of microwave microscopy probes configured to generate radio-frequency electromagnetic radiation for interaction with different electrically-conductive loops defined in the electrically-conductive mesh of the composite component.

32. A system comprising:
 a composite component comprising an electrically-conductive mesh including an electrical conductor defining an electrically-conductive loop; and
 a microwave microscopy probe configured to generate radio-frequency electromagnetic radiation for interaction with the electrically-conductive mesh of the composite component, the microwave microscopy probe comprising a tip shaped to magnetically couple with a majority of the electrically-conductive loop defined by the electrical conductor.

33. The system as defined in claim 32, wherein the tip is shaped to magnetically couple with substantially the entire electrically-conductive loop defined by the electrical conductor.

34. The system as defined in claim 32, wherein the tip defines a two-dimensional shape that substantially matches a majority of a two-dimensional shape of the electrically-conductive loop defined by the electrical conductor.

35. The system as defined in claim 32, wherein the tip defines a two-dimensional shape that substantially matches an entirety of a two-dimensional shape of the electrically-conductive loop defined by the electrical conductor.

36. The system as defined in claim 34, wherein the two-dimensional shape of the tip substantially defines a quadrilateral.

37. The system as defined in claim 34, wherein the two-dimensional shape of the tip substantially defines a rhomboid.

38. The system as defined in claim 32, wherein the microwave microscopy probe is configured to be resiliently biased against the component.

39. The system as defined in claim 32, wherein the microwave microscopy probe comprises a probe conductor printed on a film.

40. The system as defined in claim 32, comprising a plurality of microwave microscopy probes configured to generate radio-frequency electromagnetic radiation for interaction with different electrically-conductive loops defined in the electrically-conductive mesh of the composite component.

41. The system as defined in claim 32, wherein the electrically-conductive loop outlines an opening in the electrically-conductive mesh.

42. The system as defined in claim 32, wherein the electrically-conductive loop surrounds a plurality of openings in the electrically-conductive mesh.

* * * * *